(12) United States Patent
Kim et al.

(10) Patent No.: US 12,381,420 B2
(45) Date of Patent: Aug. 5, 2025

(54) WIRELESS POWER RECEIVER AND WIRELESS POWER TRANSMITTER

(71) Applicant: SKC CO., LTD., Gyeonggi-do (KR)

(72) Inventors: Nah Young Kim, Gyeonggi-do (KR);
Seung Hwan Lee, Gyeonggi-do (KR);
Jong Hak Choi, Gyeonggi-do (KR);
Tae Kyoung Kim, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 564 days.

(21) Appl. No.: 17/962,000

(22) Filed: Oct. 7, 2022

(65) Prior Publication Data

US 2023/0057615 A1 Feb. 23, 2023

Related U.S. Application Data

(63) Continuation of application No. PCT/KR2021/011511, filed on Aug. 27, 2021.

(30) Foreign Application Priority Data

Aug. 27, 2020 (KR) .......... 10-2020-0108384

(51) Int. Cl.
*H02J 50/12* (2016.01)
*H02J 50/00* (2016.01)
*H02J 50/80* (2016.01)

(52) U.S. Cl.
CPC .......... *H02J 50/12* (2016.02); *H02J 50/005* (2020.01); *H02J 50/80* (2016.02)

(58) Field of Classification Search
CPC .......... H02J 50/12; H02J 50/80; H02J 50/005
USPC .......................................... 320/108
See application file for complete search history.

(56) References Cited

U.S. PATENT DOCUMENTS

| 2017/0179933 A1* | 6/2017 | Garrity | H01F 38/14 |
| 2020/0144847 A1* | 5/2020 | Fang | H02J 50/70 |

FOREIGN PATENT DOCUMENTS

| CN | 111342565 A | 6/2020 |
| KR | 10-2012-0046027 A | 5/2012 |
| KR | 10-2013-0042201 A | 4/2013 |
| KR | 10-2015-0000704 A | 1/2015 |
| KR | 10-2017-0075608 A | 7/2017 |
| KR | 10-1773403 B1 | 8/2017 |
| KR | 10-2019-0030019 A | 3/2019 |
| WO | 2015/162859 A1 | 10/2015 |

OTHER PUBLICATIONS

Action for Japanese Patent Application No. 2022-564103 on Oct. 31, 2023.

(Continued)

*Primary Examiner* — Nathaniel R Pelton
(74) *Attorney, Agent, or Firm* — IP & T GROUP LLP

(57) ABSTRACT

A wireless power receiver includes a receiving pad configured to receive power transmitted from a wireless power transmitter including a transmitting pad and a transmitting side resonant inductor, and a receiving side resonant network including a receiving side resonant inductor that controls power supplied to the receiving pad. Further, a first inductance of the receiving side resonant inductor and a second inductance of the transmitting side resonant inductor are determined to be different from each other.

10 Claims, 13 Drawing Sheets

(56) References Cited

OTHER PUBLICATIONS

Chen Yafei et al., An Efficiency Optimization-Based Asymmetric Tuning Method of Double-Sided LCC Compensated WPT System for Electric Vehicles, IEEE Transactions On Power Electronics, vol. 35, No. 11, Apr. 2, 2020, pp. 11475-11487.
Kan Tianze et al., A New Integration Method for an Electric Vehicle Wireless Charging System Using LCC Compensation Tolology: Analysis and Design, IEEE Transactions On Power Electronics, vol. 32, No. 2, Apr. 7, 2016, pp. 1638-1650.
Lu Fei et al., A Dual-Coupled LCC-Compensated IPT System With a Compact Magnetic Coupler, IEEE Transactions On Power Electronics, vol. 33, No. 7, Aug. 31, 2017, pp. 6391-6402.
Extended European Search Report for the European Patent Application No. 21862122.5 issued by the European Patent Office on Feb. 29, 2024.
International Search Report for the International Application No. PCT/KR2021/011511 issued by the Korean Intellectual Property Office on Dec. 6, 2021.
Office Action for the Korean Patent Application No. 10-2020-0108384 issued by the Korean Intellectual Property Office on Feb. 25, 2022.
Notice of Allowance for the Korean Patent Application No. 10-2020-0108384 issued by the Korean Intellectual Property Office on Aug. 24, 2022.

\* cited by examiner

FIG.5
| CR | 1.0 | 0.8 |
|---|---|---|
| CURRENT AT RECEIVING SIDE (A) | 38.6 | 31.9 |
| MAGNETIC FLUX DENSITY OF TRANSMITTING PAD (mT) | 43.5 | 51.2 |
| MAGNETIC FLUX DENSITY OF RECEIVING PAD (mT) | 77.5 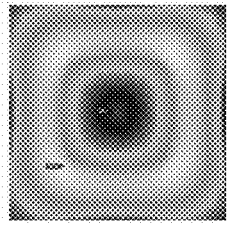 | 63 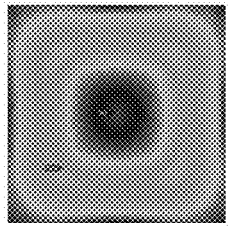 |

FIG.6

| MAGNETIC PORTION A (u' > 300) | COMPARATIVE EXAMPLE 1 | | EMBODIMENT 1 | |
|---|---|---|---|---|
| | CR =1 | | CR =0.8 | |
| TIME | CHARGING EFFICIENCY | HEAT GENERATION TEMPERATURE | CHARGING EFFICIENCY | HEAT GENERATION TEMPERATURE |
| 0 min | 92.5 | 25 | 92.7 | 25 |
| 10 min | 92.3 | 56.6 | 92.6 | 53.1 |
| 20 min | 91 | 74.6 | 91.3 | 66.8 |
| 30 min | 91 | 85.3 | 91.3 | 72.5 |

FIG. 9

| MAGNETIC PORTION B ($\mu' \leq 300$) | | COMPARATIVE EXAMPLE 1 | | EMBODIMENT 1 | | EMBODIMENT 2 | |
|---|---|---|---|---|---|---|---|
| | | CR = 1 | | CR = 0.8 | | CR = 0.6 | |
| | TIME | CHARGING EFFICIENCY | HEAT GENERATION TEMPERATURE | CHARGING EFFICIENCY | HEAT GENERATION TEMPERATURE | CHARGING EFFICIENCY | HEAT GENERATION TEMPERATURE |
| | 0 min | 89.2 | 25 | 91.2 | 25 | 91.7 | 25 |
| | 5 min | 88.9 | 53.8 | 91.2 | 39.3 | 91.6 | 32.9 |
| | 10 min | 88.8 | 80.1 | 91.1 | 54.4 | 91.6 | 41.6 |
| | 15 min | 88.6 | 93.5 | 91 | 65.9 | 91.6 | 47.6 |
| | 20 min | 88.5 | 101.7 | 91 | 75.7 | 91.6 | 53.1 |
| | 25 min | 88.3 | 110.2 | 91 | 83.4 | 91.6 | 55.6 |
| | 30 min | 88.1 | 117.6 | 91 | 89.3 | 91.6 | 57.8 |

FIG.14

| TRANSMITTING SIDE | RECEIVING SIDE | MAGNETIC PORTION A | | MAGNETIC PORTION B | |
|---|---|---|---|---|---|
| | | CHARGING EFFICIENCY (%) | HEAT GENERATION TEMPERATURE (°C) | CHARGING EFFICIENCY (%) | HEAT GENERATION TEMPERATURE (°C) |
| CR = 1 | CR = 1 | 90 | 78 | 89 | 91 |
| CR = 1 | CR = 0.8 | 90 | 63 | 91 | 55 |
| CR = 0.8 | CR = 1 | 91 | 80 | 90 | 88 |
| CR = 0.8 | CR = 0.8 | 91 | 64 | 91 | 52 |

WIRELESS POWER RECEIVER AND WIRELESS POWER TRANSMITTER

CROSS-REFERENCE OF RELATED APPLICATIONS

This application is a Bypass Continuation Application of PCT/KR2021/011511 filed on Aug. 27, 2021, which claims priority to Korean Patent Application No. 10-2020-0108384 filed on Aug. 27, 2020, which are incorporated herein by reference in their entirety.

TECHNICAL FIELD

The present disclosure relates to a wireless power receiver and wireless power transmitter which receive and transmit wireless power.

BACKGROUND

In general, wireless power transmission refers to a technology for supplying power to a means of transport using wireless electricity without a conventional wired power line. Various types of wireless power transmission are being developed due to advantages such as offering more user convenience in the use of electricity, reducing the risk of electrical shock, and enhancing aesthetical appearance.

Notably, with growing interest in long-range wireless power transmission which can maximize user convenience, many related studies are actively underway.

Conventional wireless power transceivers are configured by designing parameters for a resonant network, and their output power is determined by using the same configuration on a transmitting side resonant inductor and a receiving side resonant inductor.

Magnetic materials are being used as the material of pads in recent years, in order to uniformly distribute a magnetic flux generated by transmitting/receiving pads used in wireless power transceivers. However, some of these magnetic materials are hard to apply in real-life settings where the inside of a space is enclosed, due to their low permeability and relatively high heat generation.

SUMMARY

In view of above, the present disclosure provides a wireless power receiver and a wireless power transmitter for controlling current and magnetic flux in consideration of the characteristics of magnetic materials of pads used in the wireless power transceiver.

Further, the present disclosure provides a wireless power receiver and a wireless power transmitter for reducing heat generated by pads used in the wireless power transceiver.

In accordance with an embodiment of the present disclosure, there is provided a wireless power receiver including: a receiving pad configured to receive power transmitted from a wireless power transmitter including a transmitting pad and a transmitting side resonant inductor; and a receiving side resonant network including a receiving side resonant inductor that controls power supplied to the receiving pad. Further, a first inductance of the receiving side resonant inductor and a second inductance of the transmitting side resonant inductor are determined to be different from each other.

Further, the first inductance of the receiving side resonant inductor may be determined to be lower than the second inductance of the transmitting side resonant inductor.

Further, the ratio of the first inductance to the second inductance may be determined to be less than 1.

Further, when the receiving pad has a permeability greater than 300 H/m and the ratio between the first inductance and the second inductance is less than 1, a heat generation temperature variation rate measured during 30 minutes from the time the power may be received from the wireless power transmitter is less than or equal to 2.0° C./min.

Further, when the receiving pad has a permeability greater than 300 H/m and the ratio between the first inductance and the second inductance is less than 1, a heat generation temperature variation rate measured during 10 minutes from the time the power is received from the wireless power transmitter may be less than or equal to 3.1° C./min.

Further, when the receiving pad has a permeability of 300 H/m or less and the ratio between the first inductance and the second inductance is less than 1, a heat generation temperature variation rate measured during 30 minutes from the time the power is received from the wireless power transmitter may be less than or equal to 3.00° C./min.

In accordance with another embodiment of the present disclosure, there is provided a wireless power transmitter including: a transmitting pad configured to transmit power to a wireless power receiver including a receiving pad and a receiving side resonant inductor; and a transmitting side resonant network including a transmitting side resonant inductor that controls power supplied to the transmitting pad. Further, a first inductance of the receiving side resonant inductor and a second inductance of the transmitting side resonant inductor are determined to be different from each other.

Further, the first inductance of the receiving side resonant inductor may be determined to be lower than the second inductance of the transmitting side resonant inductor, and the ratio of the first inductance to the second inductance may be determined to be less than 1.

Further, when the transmitting pad has a permeability greater than 300 H/m and the ratio between the first inductance and the second inductance is less than 1, a heat generation temperature variation rate measured during 30 minutes from the time the power is transmitted to the wireless power receiver may be less than or equal to 2.0° C./min. When the transmitting pad has a permeability greater than 300 H/m and the ratio between the first inductance and the second inductance is less than 1, a heat generation temperature variation rate measured during 20 minutes from the time the power is transmitted to the wireless power receiver may be less than or equal to 2.4° C./min. Further, when the transmitting pad has a permeability greater than 300 H/m and the ratio between the first inductance and the second inductance is less than 1, a heat generation temperature variation rate measured during 10 minutes from the time the power may be transmitted to the wireless power receiver is less than or equal to 3.1° C./min.

Further, when the transmitting pad has a permeability of 300 H/m or less and the ratio between the first inductance and the second inductance is less than 1, a heat generation temperature variation rate measured during 30 minutes from the time the power is transmitted to the wireless power receiver may be less than or equal to 3.00° C./min. when the transmitting pad has a permeability of 300 H/m or less and the ratio between the first inductance and the second inductance is less than 1, a heat generation temperature variation rate measured during 20 minutes from the time the power is transmitted to the wireless power receiver may be less than or equal to 3.8° C./min. Further, when the transmitting pad has a permeability of 300 H/m or less and the ratio between the first inductance and the second inductance is less than 1, a heat generation temperature variation rate measured during 10 minutes from the time the power is transmitted to the wireless power receiver may be less than or equal to 5.50° C./min.

In accordance with still another embodiment of the present disclosure, there is provided a means of transport including: a wireless power receiver including a receiving pad configured to receive power transmitted from a wireless power transmitter having a transmitting pad and a transmitting side resonant inductor, and a receiving side resonant network having a receiving side resonant inductor that controls power supplied to the receiving pad; and a battery that is charged with power received by using the wireless power receiver, wherein a first inductance of the receiving side resonant inductor and a second inductance of the transmitting side resonant inductor are determined to be different from each other.

According to the embodiments of the present disclosure, it is possible to reduce heat generated by transmission/reception pads by designing a transmitting side resonant inductor and a receiving side resonant inductor asymmetrically.

Further, according to the embodiments of the present disclosure, it is possible to uniformly distribute a magnetic flux through the transmission/reception pads by optimizing the inductances of the transmitting side resonant inductor and the receiving side resonant inductor.

Further, according to the embodiments of the present disclosure, it is possible to control heat generation more efficiently by taking the material of transmitting/receiving pads into consideration.

Further, according to the embodiments of the present disclosure, it is possible to improve the compatibility between the wireless power transmitter and the wireless power receiver even with different CR values, by varying the configuration of the transmitting side resonant inductor.

BRIEF DESCRIPTION OF THE DRAWINGS

FIG. 5 is a table showing the variation of magnetic flux distribution in the transmitting and receiving pads versus CR.

FIG. 6 is a table showing the charging efficiency and heat generation temperature over time at different CR values when the receiving pad has a magnetic permeability greater than 300.

FIG. 9 is a table showing the charging efficiency and heat generation temperature over time at different CR values when the receiving pad has a magnetic permeability of 300 or less.

FIG. 14 is a table showing characteristics of charging efficiency and heat generation temperature according to an embodiment.

DETAILED DESCRIPTION

Hereinafter, an exemplary embodiment of the present disclosure will be described in detail with reference to the accompanying drawings.

Figure 1:
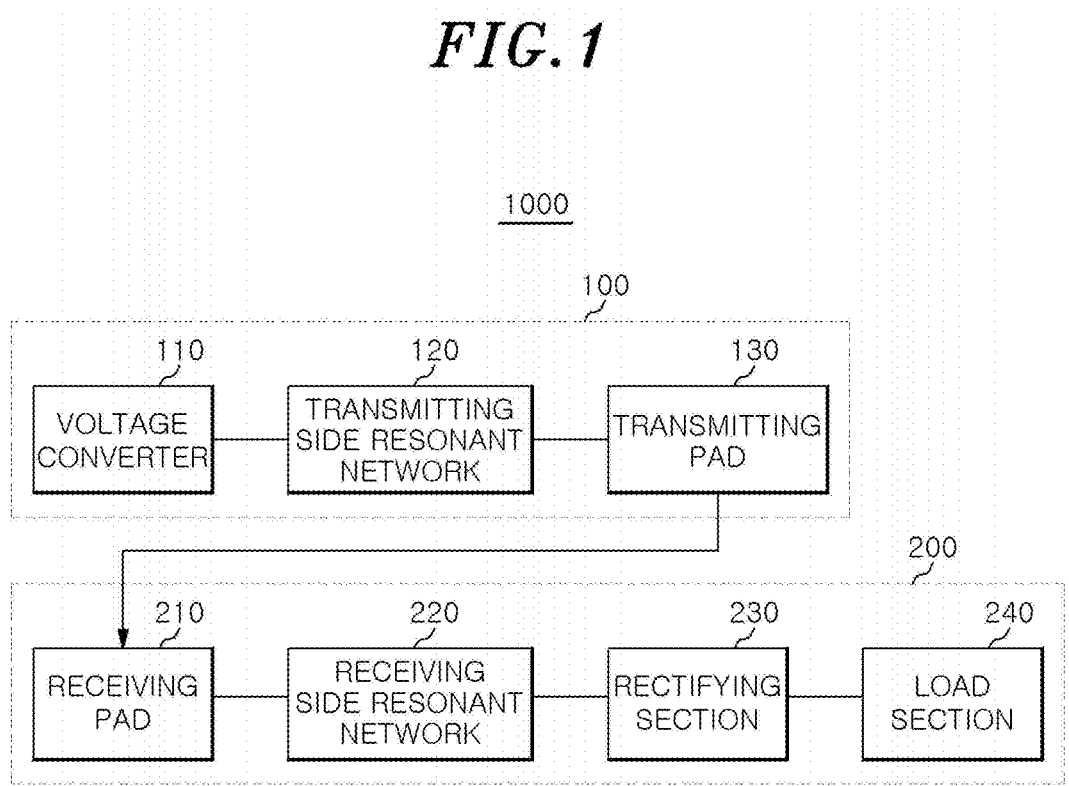
FIG. 1 is a block diagram showing a wireless power transceiver according to an embodiment.
Figure 2:
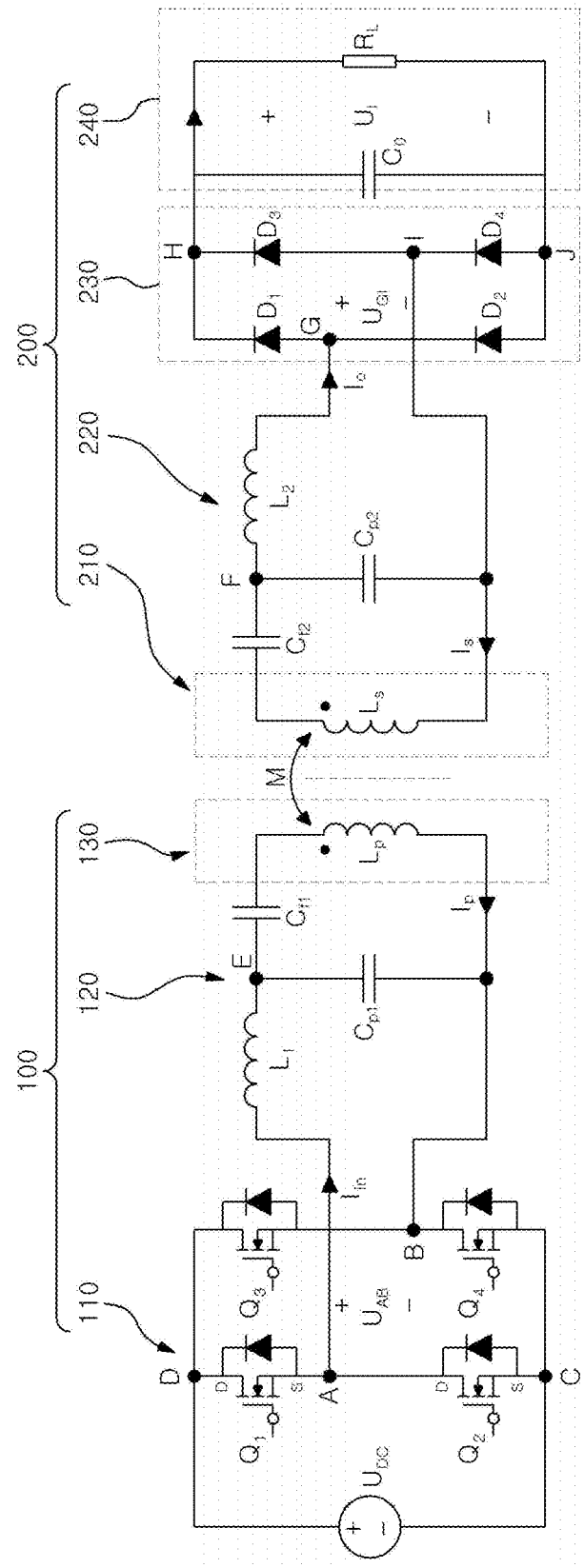
FIG. 2 is a circuit diagram of the wireless power transceiver of FIG. 1.

FIG. 1 is a block diagram showing a wireless power transceiver according to an embodiment of the present disclosure. FIG. 2 is a circuit diagram of the wireless power transceiver of FIG. 1.

Referring to FIGS. 1 and 2, the wireless power transceiver 1000 according to the embodiment may include a wireless power transmitter 100 and a wireless power receiver 200.

The wireless power transmitter 100 may include a voltage converter 110, a transmitting side resonant network 120, and a transmitting pad 130.

The voltage converter 110 may convert a first input voltage UDC of DC into an AC voltage.

The voltage converter 110 may include a plurality of rectifiers $Q_1$, $Q_2$, $Q_3$, and $Q_4$, and each of the rectifiers $Q_1$, $Q_2$, $Q_3$, and $Q_4$ may include an inverter (e.g., MOSFET) and a converter (e.g., diode).

The connections between the rectifiers $Q_1$, $Q_2$, $Q_3$, and $Q_4$ included in the voltage converter 110 are as follows. A positive terminal of the first input voltage $U_{DC}$, one end (e.g., drain of MOSFET) of the first rectifier $Q_1$, and one end (e.g., drain of MOSFET) of the third rectifier $Q_3$ may be connected to a fourth node D, and the other end (e.g., source of MOSFET) of the first rectifier $Q_1$ and one end (e.g., drain of MOSFET) of the second rectifier $Q_2$ may be connected to a first node A.

Further, one end (e.g., drain of MOSFET) of the fourth rectifier $Q_4$ and the other end (e.g., source of MOSFET) of the third rectifier $Q_3$ may be connected to a second node B, and the other end (e.g., source of MOSFET) of the second rectifier $Q_2$ and the other end (e.g., source of MOSFET) of the fourth rectifier $Q_4$ may be connected to a third node C.

The transmitting side resonant network 120 may be connected to the voltage converter 110. The transmitting side resonant network 120 may receive a second input voltage $U_{AB}$ as input which is the voltage difference between the first node A and the second node B. The second input voltage $U_{AB}$ may be an AC voltage.

The transmitting side resonant network 120 may include a transmitting side resonant inductor $L_1$, a first transmitting side resonant capacitor $C_{f1}$, and a second transmitting side resonant capacitor $C_{p1}$.

The connections between impedances included in the transmitting side resonant network 120 are as follows. One end of the transmitting side resonant inductor $L_1$, one end of the first transmitting side resonant capacitor $C_{f1}$, and one end of the second transmitting side resonant capacitor $C_{p1}$ may be connected to a fifth node E, the other end of the second transmitting side resonant capacitor $C_{p1}$ may be connected to the second node B, and the other end of the transmitting side resonant inductor $L_1$ may be connected to the first node A.

The transmitting side resonant network 120 may be implemented on an input voltage line that connects a pair of legs constituting the voltage converter 110. That is, the other end of the transmitting side resonant inductor $L_1$ and the other end of the second transmitting side resonant capacitor $C_{p1}$ may be connected to the voltage converter 110.

The transmitting pad 130 may be made of a magnet or a magnetic composite. Here, the magnet may have a permeability greater than 300 H/m, and the magnetic composite may have a permeability of 300 H/m or less.

Moreover, the magnet may include a ferrite, and the magnetic composite may include a polymer magnetic composite including a binder resin and fillers distributed in the binder resin. The polymer magnetic composite may include a polymer magnetic block PMB. However, the types of magnet and magnetic composite are not limited to the above examples.

The polymer magnetic composite may have less defects over a wide area and receive less damage from impacts as the fillers are held together by the binder resin.

The fillers may be oxide fillers such as ferrites (Ni—Zn, Mg—Zn, and Mn—Zn ferrites); metallic fillers such as permalloy, sendust, and nanocrystalline magnetic material; or a powder mixture thereof. More specifically, the fillers may be sendust particles with an alloy composition of Fe—Si—Al.

For example, the fillers may have a composition with the following Chemical Formula 1:

Fe1-$a$-$b$-$c$ Si$a$ X$b$ Y$c$ <Chemical Formula 1> where X may be Al, Cr, Ni, Cu, or a combination thereof; Y may be Mn, B, Co, Mo, or a combination thereof and $0.01 \le a \le 0.2$, $0.01 \le b \le 0.1$, and $0 \le c \le 0.05$. Specifically, in the above formula, X may be Al, Cr, or a combination thereof.

The fillers may include sendust.

The average particle diameter D50 of the fillers may range from around 1 μm to 300 μm, from around 10 μm to 200 μm, or from around 30 μm to 150 μm. If the average particle diameter of the fillers meets the above range, the rate of change of position at temperatures from 150° C. to 180° C. may be made as low as possible, thereby further improving the heat resistance properties and magnetic properties of the magnetic composite and therefore leading to better charging efficiency.

The fillers may make up 60%, 70%, or 85% by weight or more of the total weight of the polymer magnetic composite.

For example, the filler content of the polymer magnetic composite may range from 60% to 90% by weight, from 70% to 90% by weight, from 75% to 90% by weight, from 78% to 90% by weight, from 80% to 90% by weight, from 85% to 90% by weight, from 87% to 90% by weight, or from 89% to 90% by weight. If the filler content is less than 60% by weight, the rate of change of the position of the polymer magnetic composite increases and therefore the heat resistance properties of the magnetic composite degrade, which may cause deformation of and damage to the magnetic composite at high temperatures and weaken its magnetic properties and lower its charging efficiency.

The melting point Tm of the binder resin may range from 150° C. to 210° C. For example, the melting point Tm of the binder resin may range from 160° C. to 200° C., e.g., from 160° C. to 180° C. If the melting point Tm of the binder resin meets the above range, the rate of change of position at temperatures of 150° C. to 180° C. may be made as low as possible, thereby further improving the heat resistance properties and magnetic properties of the magnetic composite and therefore leading to better charging efficiency.

The binder resin may include one or more selected from the group consisting of polyimide resin, polyamide resin, polyamide-imide resin, polycarbonate resin, acrylonitrile butadiene styrene (ABS) resin, polypropylene resin, polyethylene resin, polystyrene resin, polyphenylene sulfide (PPS) resin, polyether ether ketone (PEEK) resin, silicone resin, acrylic resin, polyurethane resin, polyester resin, isocyanate resin, and epoxy resin.

The binder resin may be a curable resin. Specifically, the binder resin may be a photo-curable resin and/or a thermosetting resin, especially a resin that can be cured and adhesive. More specifically, the binder resin may be a resin containing one or more thermally curable functional groups or sites such as a glycidyl group, an isocyanate group, a hydroxy group, a carboxyl group, or an amide group; or one or more functional groups or sites that are curable by an activated energy, such as an epoxide group, a cyclic ether group, a sulfide group, an acetal group, or a lactone group. Examples of these functional groups or sites may include an isocyanate group (—NCO), a hydroxy group (—OH), or a carboxyl group (—COOH).

Specifically, the binder resin may include one or more selected from the group consisting of polyamide resin, polycarbonate resin, and polypropylene resin.

Moreover, even the use of a resin with good heat resistance properties as the binder resin may increase the rate of change of position at temperatures of 150° C. to 180° C. unless it mixes well with the fillers. Accordingly, it may be important to choose the material of the binder resin that mixes well with the fillers.

For example, a polyamide resin may be used as the binder resin, and sendust may be used as the fillers.

The binder resin content of the polymer magnetic composite may range from 5% to 40% by weight, from 10% to 40% by weight, from 10% to 20% by weight, from 5% to 20% by weight, from 5% to 15% by weight, or from 7% to 15% by weight.

According to one embodiment, the binder resin content may range from 10% to 40% by weight, and the filler content may range 60% to 90% by weight, in order that the rate of change of the position of the polymer magnetic composite is controlled to be 20% or less at temperatures of 150° C. to 180° C.

According to one embodiment, the binder resin content may range from 10% to 20% by weight, and the filler content may range from 80% to 90% by weight, in order that the rate of change of the position of the polymer magnetic composite is controlled to be 3% or less at temperatures of 150° C. to 180° C.

Furthermore, the polymer magnetic composite may further include an additive. Specifically, the polymer magnetic composite may further include one or more insulating coating agents selected from the group consisting of phosphoric acid and silane. The additive and the insulating coating agent may range from 0.1% to 10% by weight of the total weight of the polymer magnetic composite.

If the additive content is within the above range, it is easier to reduce the rate of change of position at temperatures of 150° C. to 180° C., thereby improving charging efficiency.

The polymer magnetic composite may be elongated by a certain percentage. For example, the polymer magnetic composite may have an elongation of 0.5% or more. Elongation properties are hard to obtain from ceramic magnetic composites which do not use polymer, and help reduce damage to large-area magnetic components even if they are distorted by impact. Specifically, the polymer magnetic composite may have an elongation of 0.5% or more, 1% or more, or 2.5% or more. Although there is no upper limit for elongation, increasing the polymer resin content may degrade the physical properties of the magnetic composite, such as inductance, so it is desirable to keep the elongation at or below 10%.

The transmitting pad 130 may include a flat-sheet structure, a stepwise structure, or a sandwiched structured. The transmitting pad 130 may include a transmitting coil $L_P$. The transmitting coil $L_P$ may transmit electrical energy to a receiving coil $L_S$ without physical contact between electrodes via a magnetic field.

The wireless power receiver 200 may include a receiving pad 210, a receiving side resonant network 220, a rectifying section 230, and a load section 240.

The receiving pad 210 may be made of a magnet or a magnetic composite. Here, the magnet may have a permeability greater than 300 H/m, and the magnetic composite may have a permeability of 300 H/m or less. The magnet may include a ferrite, and the magnetic composite may include a polymer magnetic composite including a binder resin and fillers distributed in the binder resin. The polymer magnetic composite may include a polymer magnetic block PMB. However, the types of magnet and magnetic composite are not limited to the above examples. A description of the polymer magnetic composite will be omitted since it will be redundant with the foregoing description of the transmitting pad 130.

The receiving pad 210 may include a receiving coil $L_S$.

The receiving side resonant network 220 may be configured in the same manner as the transmitting side resonant network 120. That is, the receiving side resonant network 220 may include a receiving side resonant inductor $L_2$, a first receiving side resonant capacitor $C_{f2}$, and a second receiving side resonant capacitor $C_{p2}$.

Similar to the transmitting side resonant network 120, one end of the first receiving side resonant capacitor $C_{f2}$ and one end of the receiving side resonant inductor $L_2$ may be connected to a sixth node F. The other end of the receiving side resonant inductor $L_2$ may be connected to a seventh node G. Further, one end of the second receiving side resonant capacitor $C_{p2}$ may be connected to the sixth node F, and the other end of the second receiving side resonant capacitor $C_{p2}$ may be connected to the ninth node I.

The rectifying section 230 is a full bridge circuit with a plurality of diodes $D_1$, $D_2$, $D_3$, and $D_4$, which may rectify a voltage received from the receiving side resonant network 220 by the diodes $D_1$, $D_2$, $D_3$, and $D_4$ and transmit it to the load section 240.

One end of the first diode $D_1$ and one end of the third diode $D_3$ may be connected to an eighth node H, and the other end of the first diode $D_1$ and one end of the second diode $D_2$ may be connected to the seventh node G. The other end of the third diode $D_3$ and one end of the fourth diode $D_4$ may be connected to the ninth node I, and the other end of the second diode $D_2$ and the other end of the fourth diode $D_4$ may be connected to a tenth node J.

The load section 240 is comprised of an output capacitor Co and a load resistor $R_L$, in which case the load resistor $R_L$ may be a battery. Both ends of the output capacitor Co may be connected to upper and lower contact points of the full bridge circuit constituting the rectifying section 230 and receive a rectified output voltage through the rectifying section 230. For example, both ends of the output capacitor Co may be connected between the eight node H and the tenth node J.

Meanwhile, the transmitting side resonant network 120 and the receiving side resonant network 220 may compensate for an impedance between the transmitting coil $L_P$ of the transmitting pad 130 and the receiving coil $L_S$ of the receiving pad 210.

To this end, the inductance of the transmitting side resonant inductor $L_1$ of the transmitting side resonant network 120 and the inductance of the receiving side resonant inductor $L_2$ of the receiving side resonant network 220 may be set. The inductance of the transmitting side resonant inductor $L_1$ and the inductance of the receiving side resonant inductor $L_2$ may be set based on size and weight limitations of the transmitting and receiving coils.

As in equation 1, an output current $I_o$ of the receiving side resonant network 220 may be inversely proportional to the product of the inductance of the transmitting side resonant inductor $L_1$ and the inductance of the receiving side resonant inductor $L_2$.

$$I_o \propto \frac{1}{L_1 L_2} \qquad <\text{Equation 1}>$$

As in equation 2, a transmitting coil current $I_p$ of the transmitting side resonant network 120 may be inversely proportional the inductance of the transmitting side resonant inductor $L_1$.

$$I_p \propto \frac{1}{L_1} \qquad <\text{Equation 2}>$$

Figure 3:
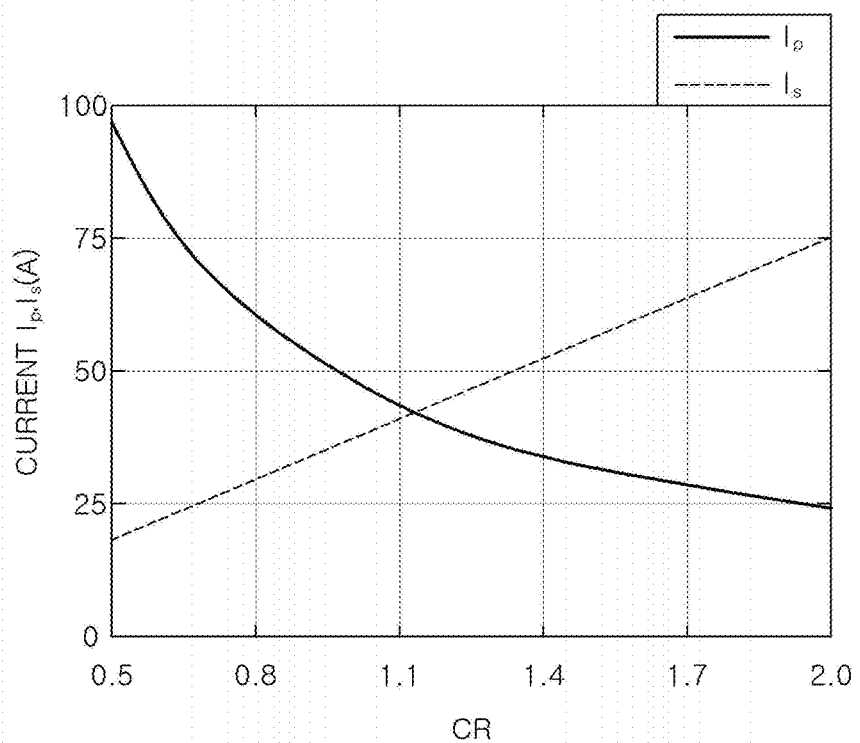
FIG. 3 is a graph showing the change of the value of receiving coil current and the value of transmitting coil current versus CR.

As shown in FIG. 3, a receiving coil current $I_s$ of the receiving pad 210 may be inversely proportional to the product of the inductance of the transmitting side resonant inductor $L_1$ and the square of the inductance of the receiving side resonant inductor $L_2$.

$$I_s \propto \frac{1}{L_1 L_2^2} \qquad <\text{Equation 3}>$$

In an embodiment, when determining the output power, the inductance of the transmitting side resonant inductor $L_1$ and the inductance of the receiving side resonant inductor $L_2$ may be regulated or changed to vary the transmitting coil current $I_p$ that is the current at the transmitting side and the receiving coil current $I_s$ that is the current at the receiving side.

For example, when the product of the inductance of the transmitting side resonant inductor $L_1$ and the inductance of the receiving side resonant inductor $L_2$ is constant, increasing the inductance of the transmitting side resonant inductor $L_1$ and decreasing the inductance of the receiving side resonant inductor $L_2$ may decrease the transmitting coil current $I_p$ and increase the receiving coil current $I_s$. Inversely, decreasing the inductance of the transmitting side resonant inductor $L_1$ and increasing the inductance of the receiving side resonant inductor $L_2$ may increase the transmitting coil current $I_p$ and decrease the receiving coil current $I_s$.

The inductance of the transmitting side resonant inductor $L_1$ may be defined as in equation 4. Here, the CR (current ratio) is a coefficient determined based on the transmitting side resonant inductor $L_1$ and the receiving side resonant inductor $L_2$.

$$L_1 = CR \cdot L' \qquad \text{<Equation 4>}$$

The inductance of the receiving side resonant inductor $L_2$ may be defined as in equation 5:

$$L_2 = \frac{1}{CR} L' \qquad \text{< Equation 5 >}$$

where L' may be calculated by using the first input voltage UDC, an output power $P_o$, a load resistance $R_o$, the coupling coefficient k of the wireless power transmitter 100 and the wireless power receiver 200, the resonant frequency $W_o$ of the wireless power transmitter 100 and the wireless power receiver 200, and the inductances of the transmitting coil $L_p$ and receiving coil $L_s$, as in equation 6.

According to equation 4 and equation 5, the CR may be $$\sqrt{\frac{L_1}{L_2}}$$

$$L' = \sqrt{L_1 - L_2} \sqrt{\frac{4kU_{DC}}{\pi\omega_0} \sqrt{\frac{L_p L_s R_o}{P_o}}} \qquad \text{< Equation 6 >}$$

In an embodiment, when the CR is determined by equation 4 and equation 5, the transmitting coil current $I_p$ and the receiving coil current Is may be determined to be inversely proportional to each other.

Accordingly, once the transmitting coil current $I_p$ and the receiving coil current $I_s$ are regulated, current loss occurring in the transmitting pad 130 and the receiving pad 210 may be regulated and therefore the amount of heat generation in each of the wireless power transmitter 100 and the wireless power receiver 200 may be regulated.

For example, if a material with low magnetic properties is used for the receiving pad 1210, the heat generation of the receiving pad 210 may be reduced by decreasing the receiving coil current $I_s$ and increasing the transmitting coil current $I_p$, thereby improving overall efficiency.

Moreover, the magnetic flux $\varphi_p$ of the transmitting pad 130 may be determined by equation 7, and the magnetic flux $\varphi_s$ of the receiving pad 210 may be determined by equation 8.

$$|\varPhi_p| = \frac{|I_p|L_{pk1} + |I_{LM}|L_m}{N} \qquad \text{< Equation 7 >}$$

$$|\varPhi_s| = \frac{|I_s|L_{sk2} + |I_{LM}|L_m}{N} \qquad \text{< Equation 8 >}$$

where $L_{pk1}$ is the leakage inductance of the transmitting coil $L_P$, $L_{sk2}$ is the leakage inductance of the receiving coil $L_s$, $L_m$ is magnetizing inductance, and $I_{LM}$ is magnetizing current.

As in equation 7 and equation 8, it can be seen that the magnetic flux $\varphi_p$ of the transmitting pad 130 and the magnetic flux $\varphi_s$ of the receiving pad 210 are affected by the transmitting coil current $I_p$ and the receiving coil current $I_s$.

Accordingly, controlling the CR makes it possible to regulate magnetic flux distribution such that there is no magnetic flux locally generated in the transmitting and receiving pads 130 and 210, which enables more efficient control of the heat generation in the transmitting and receiving pads 130 and 210.

Figure 4:
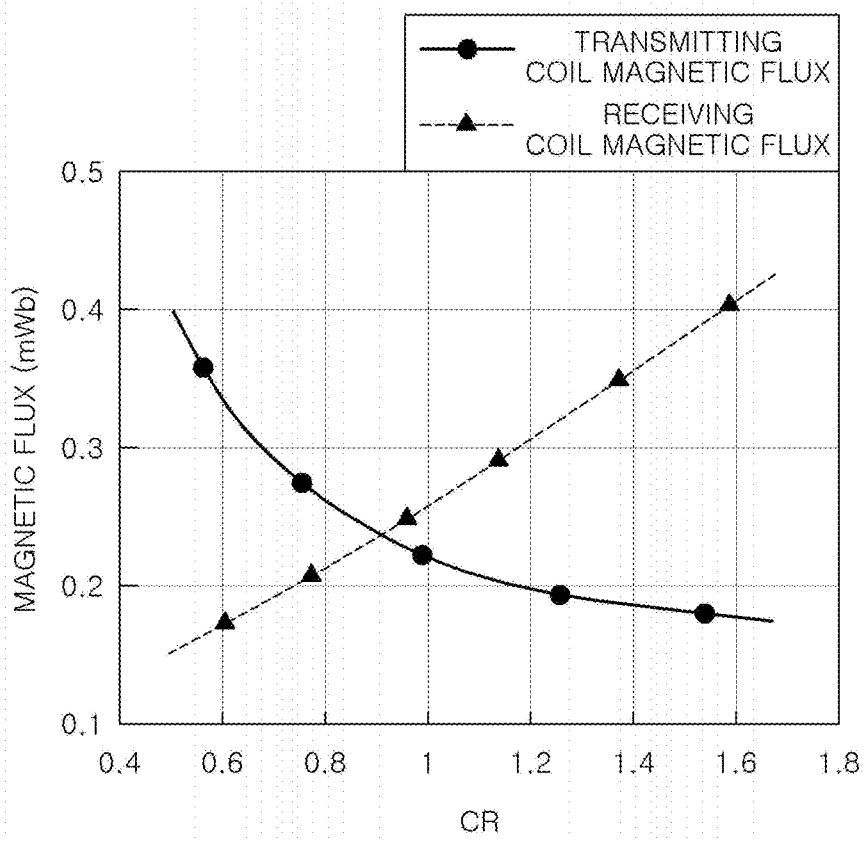
FIG. 4 is a graph showing the change of the value of transmitting coil magnetic flux and the value of receiving coil magnetic flux versus CR.

FIG. 3 is a graph showing the change of the value of the receiving coil current $I_s$ and the value of transmitting coil current $I_p$ versus CR. FIG. 4 is a graph showing the change of the value of the transmitting coil magnetic flux and the value of receiving coil magnetic flux versus CR.

Referring to FIG. 2 and FIG. 3 in which the magnitude of the transmitting coil current $I_p$ and the magnitude of the receiving coil current $I_s$ are compared with respect to CR, it can be seen that the transmitting coil current $I_p$ is greater than the receiving coil current $I_s$ when the CR is less than or equal to approximately 1.1. On the other hand, it can be seen that the transmitting coil current $I_p$ is smaller than the receiving coil current $I_s$ when the CR is greater than approximately 1.1. Here, it is presumed that the transmitting and receiving pads 130 and 210 are made using a magnetic material and the output power is 6.6 kW, but not limited thereto.

Further, referring to FIG. 2 and FIG. 4 in which the magnetic fluxes of the transmitting and receiving pads 130 and 210 are compared in the same condition as those of FIG. 3 with respect to CR, it can be seen that the magnetic flux $\varphi_p$ of the transmitting coil is greater than the magnetic flux $\varphi_s$ of the receiving coil when the CR is less than or equal to approximately 0.9, and that the magnetic flux $\varphi_p$ of the transmitting coil is smaller than the magnetic flux $\varphi_p$ of the receiving coil when the CR is greater than approximately 0.9.

By setting the CR to be less than or equal to approximately 0.9, the current and magnetic flux of the receiving coil become smaller than the current and magnetic flux of the transmitting coil, which may reduce the heat generation in the receiving pad 210.

If the CR is less than approximately 0.6, it is difficult to achieve inductance, making it difficult to measure the currents and magnetic fluxes of the transmitting and receiving coils. Therefore, the CR may be set to a value of 0.6 to 0.9.

FIG. 5 is a view showing the variation of magnetic flux distribution in the transmitting and receiving pads versus CR.

Referring to FIGS. 2 and 5, it can be seen that, when the CR is 1.0, the transmitting pad 130 may have a magnetic flux density of 43.5 mT and the receiving pad 210 may have a magnetic flux density of 77.5 mT. On the other hand, it can be seen that, when the CR is 0.8, the transmitting pad 130 may have a magnetic flux density of 51.2 mT and the receiving pad 210 may have a magnetic flux density of 63 mT.

When the CR is 0.8, it can be seen that the receiving pad 210 has a lower magnetic flux density and a more uniform magnetic flux distribution over the entire area of the receiving pad 210, as compared to when the CR is 1, which results in less heat generation.

Hereinafter, a process of measuring charging efficiency and heat generation temperature with respect to the material of the transmitting pad and receiving pad and the CR will be described.

For measurement, the charging frequency was set to 85 kHz, and voltage and current were supplied using a power supply. Moreover, E-Load, which is used for performance diagnostic testing, was connected to a tip end of the wireless power receiver 200. In addition, the output power was set to 8.8 kW, and the charging efficiency and heat generation temperature of the receiving pad 210 were measured for an operation time of 30 minutes.

When there is a need to control the heat generation temperature of the receiving pad 130, the CR may be designed as CR<1, and when there is a need to control the heat generation temperature of the transmitting pad 230 because the receiver 200 is easily cooled, the CR may be designed as CR≥1.

In a case where the wireless power transceiver 1000 according to an embodiment of the present disclosure is applied to a means of transport powered by electricity (e.g., electric vehicle, electric bicycle, drone, electric kickboard, an electric motorcycle, etc.), the wireless power transmitter 100 may be installed at a charging station, and the wireless power receiver 200 may be installed at the means of transport. In this case, the means of transport may be limited in heat dissipation compared to the charging station due to size limitations, technical limitations, and so on, which calls for a method for reducing the heat generation in the means of transport.

Accordingly, in order to reduce the heat generation in the means of transport, the inductance of the transmitting side resonant inductor $L_1$ included in the wireless power transmitter 100 and/or the inductance of the receiving side resonant inductor $L_2$ included in the wireless power receiver 200 may be regulated, and therefore the heat generation temperature of the receiving pad 130 may be reduced, which may lead to, but not limited to, a reduction in the heat generation in the means of transport. That is, the above description may apply equally to reducing the heat generation in the charging station, as well as to reducing the heat generation in the means of transport.

The ratio (CR) of the inductance of the transmitting side resonant inductor $L_1$ to the inductance of the receiving side resonant inductor $L_2$ may be less than 1. Further, the ratio (CR) of the inductance of the transmitting side resonant inductor $L_1$ to the inductance of the receiving side resonant inductor $L_2$ may be greater than or equal to 0.6, 0.7, or 0.8.

Hereinafter, a comparative example 1 in which the CR is 1, an embodiment 1 in which the CR is 0.8, and an embodiment 2 in which the CR is 0.6 will be described by way of example.

The following description concerning variation rates of the charging efficiency and heat generation temperature with respect to CR will be given of, but not limited to, the receiving pad. That is, the description below may equally apply to the transmitting pad.

Figure 7:
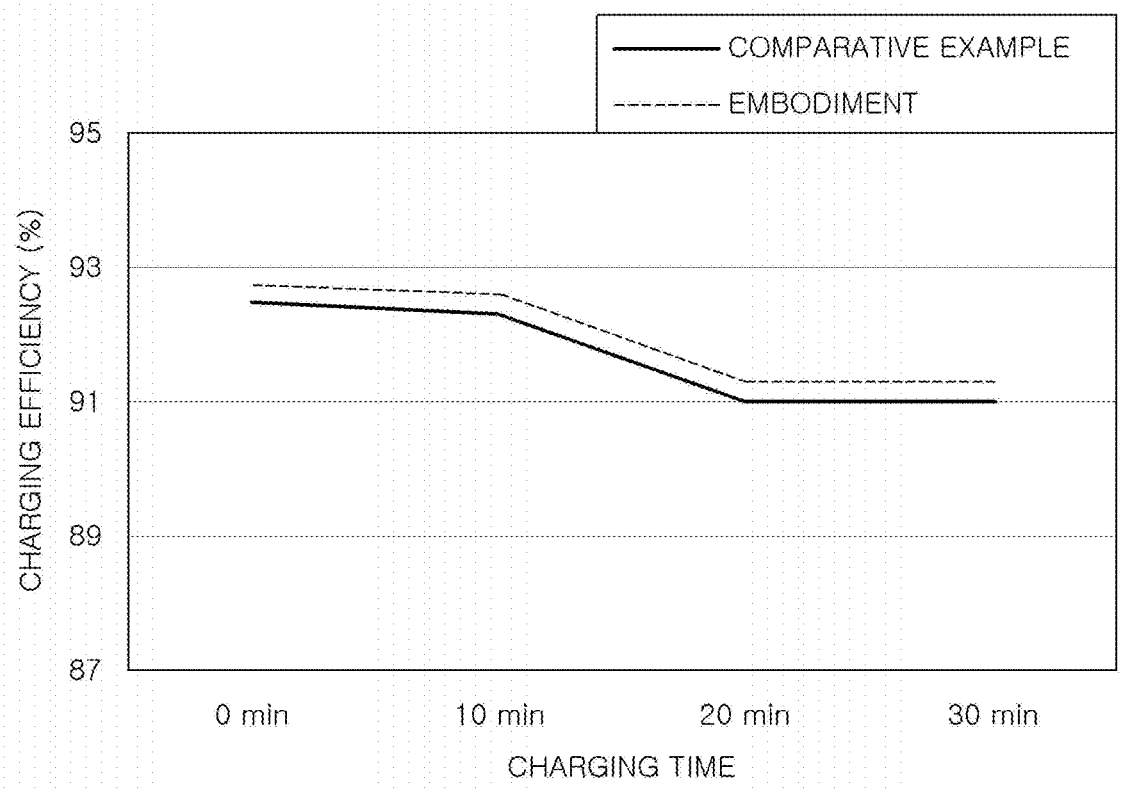
FIG. 7 is a graph showing the charging efficiency over time at different CR values when the receiving pad has a magnetic permeability greater than 300.
Figure 8:
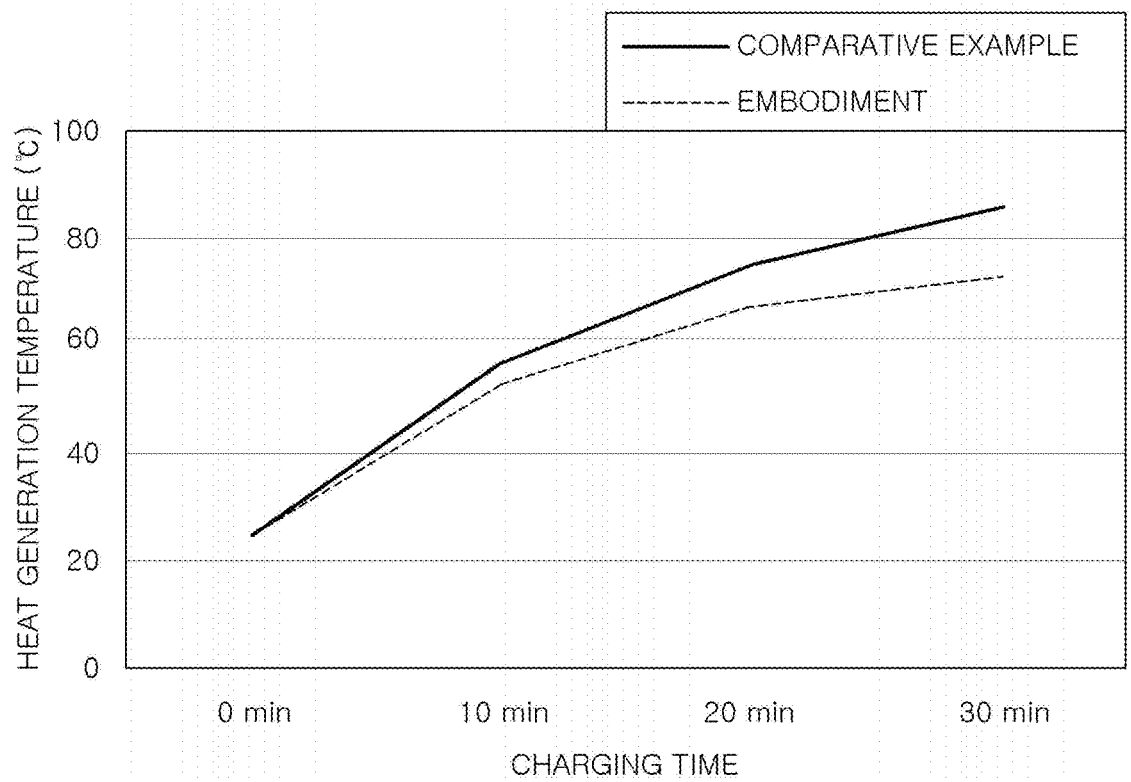
FIG. 8 is a graph showing the heat generation temperature over time at different CR values when the receiving pad has a magnetic permeability greater than 300.

FIG. 6 is a table showing the charging efficiency and heat generation temperature over time at different CR values when the receiving pad has a magnetic permeability greater than 300. FIG. 7 is a graph showing the variation of the charging efficiency over time at different CR values when the receiving pad has a magnetic permeability greater than 300. FIG. 8 is a graph showing the variation of the heat generation temperature over time at different CR values when the receiving pad has a magnetic permeability greater than 300.

Referring to FIG. 2, FIG. 6, FIG. 7, and FIG. 8, when the receiving pad 210 includes a predetermined magnetic portion A in which a magnetic permeability is greater than 300 H/m, it can be found that the embodiment 1 exhibits higher charging efficiency and lower heat generation temperature in the entire area compared to the comparative example 1. For example, the magnetic portion A may be a ferrite, but the type of the magnetic portion A is not limited to ferrites.

For example, referring to FIG. 6, it can be found that the temperature variation rate in the comparative example 1 is 3.16° C./min and the temperature variation rate in the embodiment 1 is 2.81° C./min, during 10 minutes from the charging start time (0 min). That is, it can be seen that the temperature variation rate in the embodiment 1 is less than or equal to 3.1° C./min, less than or equal to 3.0° C./min, less than or equal to 2.9° C./min, and less than or equal to 2.85° C./min during 10 minutes from the charging start time (0 min).

Further, it can be found that the temperature variation rate in the comparative example 1 is 2.48° C./min and the temperature variation rate in the embodiment 1 is 2.09° C./min, during 20 minutes from the charging start time (0 min). That is, it can be seen that the temperature variation rate in the embodiment 1 is less than or equal to 2.4° C./min, less than or equal to 2.3° C./min, less than or equal to 2.2° C./min, and less than or equal to 2.1° C./min during 20 minutes from the charging start time (0 min).

Further, it can be found that the temperature variation rate in the comparative example 1 is 2.01° C./min and the temperature variation rate in the embodiment 1 is approximately 1.58° C./min, during 30 minutes from the charging start time (0 min). That is, it can be seen that the temperature variation rate in the embodiment 1 is less than or equal to 2.0° C./min, less than or equal to 1.9° C./min, less than or equal to 1.8° C./min, less than or equal to 1.7° C./min, and less than or equal to 1.6° C./min, during 30 minutes from the charging start time (0 min).

Further, it can be found that the temperature variation rate in the comparative example 1 is 1.8° C./min and the temperature variation rate in the embodiment 1 is 1.37° C./min, between 10 minutes and 20 minutes after the start of the charging. That is, it can be seen that the temperature variation rate in the embodiment 1 is less than or equal to 1.7° C./min, less than or equal to 1.6° C./min, less than or equal to 1.5° C./min, and less than or equal to 1.4° C./min, between 10 minutes and 20 minutes after the start of the charging.

Further, it can be found that the temperature variation rate in the comparative example 1 is 1.07° C./min and the temperature variation rate in the embodiment 1 is 0.57° C./min, between 20 minutes and 30 minutes after the start of the charging. That is, it can be seen that the temperature variation rate in the embodiment 1 is less than or equal to 1.0° C./min, less than or equal to 0.9° C./min, less than or equal to 0.8° C./min, less than or equal to 0.7° C./min, and less than or equal to 0.6° C./min between 20 minutes and 30 minutes after the start of the charging. Further, the charging efficiency in the embodiment 1 may be greater than or equal to 91.1% and greater than or equal to 91.3% during 30 minutes after the start of the charging.

Figure 10:
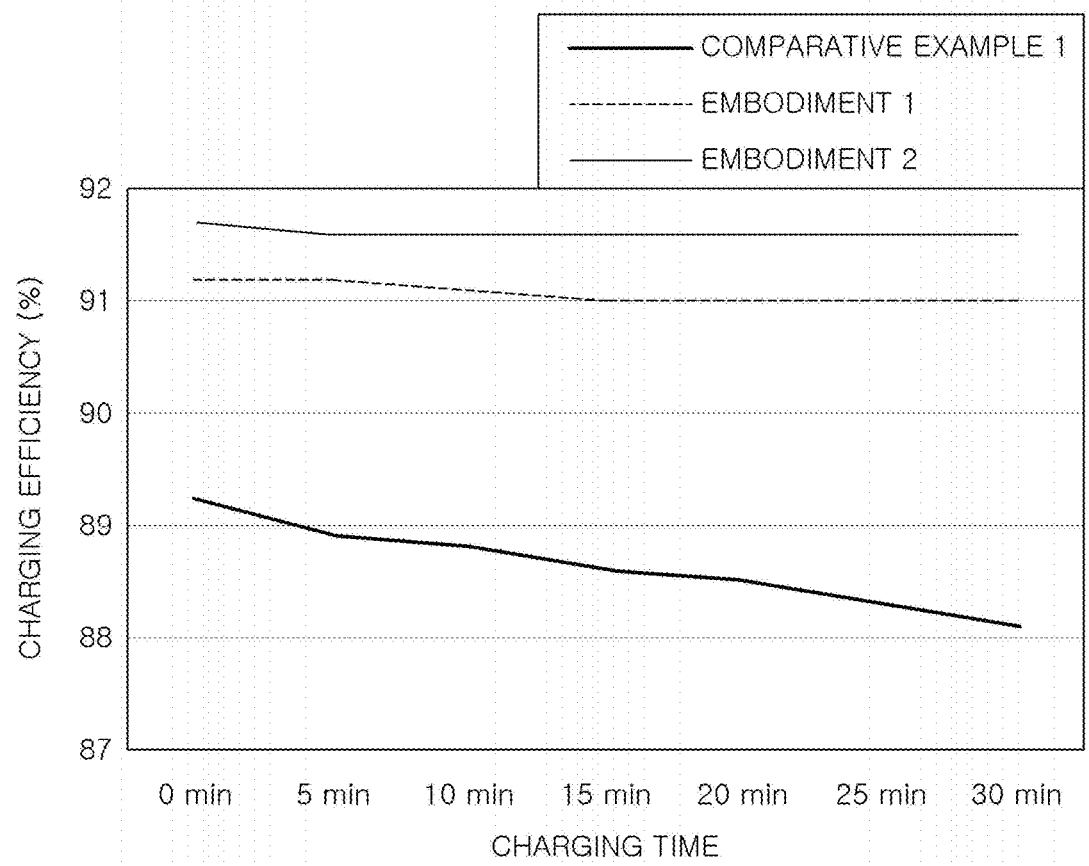
FIG. 10 is a graph showing the charging efficiency over time at different CR values when the receiving pad has a magnetic permeability of 300 or less.
Figure 11:
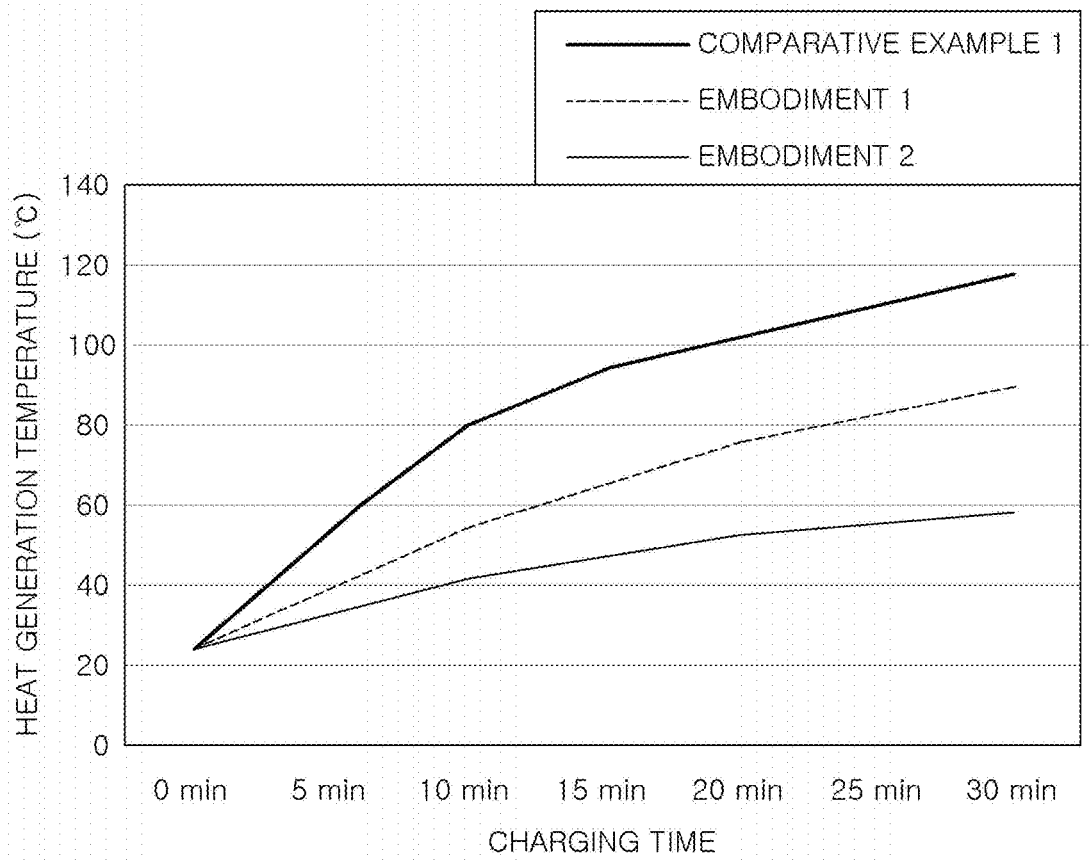
FIG. 11 is a graph showing the heat generation temperature over time at different CR values when the receiving pad has a magnetic permeability of 300 or less.

FIG. 9 is a table showing the charging efficiency and heat generation temperature over time at different CR values when the receiving pad has a magnetic permeability of 300 H/m or less. FIG. 10 is a graph showing the variation of charging efficiency over time at different CR values when the receiving pad has a magnetic permeability of 300 or less. FIG. 11 is a graph showing the variation of heat generation temperature over time at different CR values when the receiving pad has a magnetic permeability of 300 or less.

Referring to FIG. 2, FIG. 9, FIG. 10, and FIG. 11, when the receiving pad 210 includes a magnetic portion B having a magnetic permeability of 300 H/m or less, it can be found that the comparative example 1 exhibits a degradation in charging efficiency over time, whereas the embodiment 1 and the embodiment 2 exhibit very little degradation over time. For example, the magnetic portion B may be a ferrite, but the type of the magnetic portion B is not limited to ferrites.

Moreover, when the receiving pad 210 includes the magnetic portion B having a magnetic permeability of 300 H/m or less, it can be seen that the embodiment 1 and the embodiment 2 exhibit a smaller increase in heat generation temperature compared to the comparative example 1, which leads to better efficiency in controlling heat generation temperature.

Additionally, it can be seen that the heat generation temperature according to the comparative example 1 rises at an increasingly fast pace over time during the first 10 minutes of the charging session but rises slowly over time after the first 10 minutes of the charging session. It can be seen that the heat generation temperatures according to the embodiment 1 and the embodiment 2 rise slowly (smoothly) throughout the entire charging session compared to the comparative example 1. Further, it can be seen that the heat generation temperature according to the embodiment 2 rises at an increasingly slow pace (smoothly) over time compared to the heat generation temperature according to the embodiment 1.

Referring to FIG. 9, it can be found that the comparative example 1 exhibits a temperature variation rate of 5.51° C./min, the embodiment 1 exhibits a temperature variation rate of 2.94° C./min, and the embodiment 2 exhibits a temperature variation rate of 1.66° C./min, during 10 minutes from the charging start time (0 min). That is, the temperature variation rate according to the embodiment 1 may be less than or equal to 5.50° C./min, less than or equal to 5.0° C./min, less than or equal to 4.5° C./min, less than or equal to 4.0° C./min, less than or equal to 3.5° C./min, and less than or equal to 3.0° C./min between 0 and 10 minutes. The temperature variation rate according to the embodiment 2 may be less than or equal to 5.50° C./min, less than or equal to 5.0° C./min, less than or equal to 4.5° C./min, less than or equal to 4.0° C./min, less than or equal to 3.5° C./min, less than or equal to 3.0° C./min, less than or equal to 2.5° C./min, less than or equal to 2.0° C./min, less than or equal to 1.8° C./min, and less than or equal to 1.7° C./min between 0 and 10 minutes.

Further, it can be found that the comparative example 1 exhibits a temperature variation rate of 3.84° C./min, the embodiment 1 exhibits a temperature variation rate of 2.54° C./min, and the embodiment 2 exhibits a temperature variation rate of 1.41° C./min, during 20 minutes from the charging start time (0 min). That is, the temperature variation rate according to the embodiment 1 may be less than or equal to 3.8° C./min, less than or equal to 3.5° C./min, less than or equal to 3.0° C./min, less than or equal to 2.8° C./min, and less than or equal to 2.6° C./min between 0 and 20. Further, the temperature variation rate according to the embodiment 2 may be less than or equal to 3.8° C./min, less than or equal to 3.5° C./min, less than or equal to 3.0° C./min, less than or equal to 2.8° C./min, less than or equal to 2.6° C./min, less than or equal to 2.0° C./min, less than or equal to 1.8° C./min, and less than or equal to 1.5° C./min between 0 and 20 minutes.

Further, it can be found that the comparative example 1 exhibits a temperature variation rate of 3.09° C./min, the embodiment 1 exhibits a temperature variation rate of 2.14° C./min, and the embodiment 2 exhibits a temperature variation rate of 1.09° C./min, during 30 minutes from the charging start time (0 min). That is, the temperature variation rate according to the embodiment 1 may be less than or equal to 3.0° C./min, less than or equal to 2.5° C./min, less than or equal to 2.3° C./min, and less than or equal to 2.2° C./min between 0 and 30 minutes. Further, the temperature variation rate according to the embodiment 2 may be less than or equal to 3.0° C./min, less than or equal to 2.5° C./min, less than or equal to 2.3° C./min, less than or equal to 2.2° C./min, less than or equal to 2.0° C./min, less than or equal to 1.5° C./min, and less than or equal to 1.3° C./min between 0 and 30 minutes.

Further, it can be found that the comparative example 1 exhibits a temperature variation rate of 2.16° C./min, the embodiment 1 exhibits a temperature variation rate of 2.13° C./min, and the embodiment 2 exhibits a temperature variation rate of 1.15° C./min, between 10 and 20 minutes from the charging start time (0 min). That is, the temperature variation rate according to the embodiment 1 may be less than or equal to 2.15° C./min and less than or equal to 2.14° C./min between 10 and 20 minutes after the start of the charging. Further, the temperature variation rate according to the embodiment 2 may be less than or equal to 2.15° C./min, less than or equal to 2.14° C./min, less than or equal to 2.0° C./min, less than or equal to 1.5° C./min, and less than or equal to 1.3° C./min between 10 and 20 minutes after the start of the charging.

Further, it can be found that the comparative example 1 exhibits a temperature variation rate of 1.59° C./min, the embodiment 1 exhibits a temperature variation rate of 1.36° C./min, and the embodiment 2 exhibits a temperature variation rate of 0.47° C./min, between 20 and 30 minutes from the charging start time (0 min). That is, the temperature variation rate according to the embodiment 1 may be less than or equal to 1.58° C./min, less than or equal to 1.5° C./min, and less than or equal to 1.4° C./min between 20 and 30 minutes after the start of the charging. Further, the temperature variation rate according to the embodiment 2 may be less than or equal to 1.58° C./min, less than or equal to 1.5° C./min, less than or equal to 1.4° C./min, less than or equal to 1.0° C./min, and less than or equal to 0.6° C./min between 20 and 30 minutes after the start of the charging.

Moreover, it can be seen that, when charging is performed for 30 minutes from the charging start time (0 min), the charging efficiency according to the embodiment 1 and the embodiment 2 is greater than or equal to 88.2%, greater than or equal to 88.5%, greater than or equal to 89.0%, greater than or equal to 89.3%, greater than or equal to 90%, and greater than or equal to 91%.

As can be seen from FIGS. 9 to 11, better charging efficiency and lower heat generation temperature can be achieved when the CR is 0.6, compared to when the CR is 0.8—that is, the lower the CR, the better the charging efficiency and the lower the heat generation temperature.

Meanwhile, although the transmitting side resonant inductor $L_1$ of FIG. 2 is configured as, but not limited to, a single inductor, it may be formed in various structures.

Figure 12:
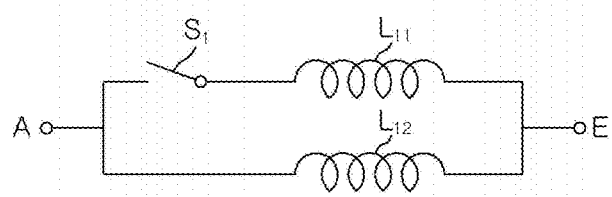
FIGS. 12 and 13 are views showing modifications of the transmitting side resonant inductor.
Figure 13:
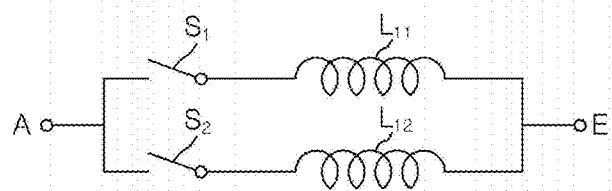

FIGS. 12 and 13 are views showing modifications of the transmitting side resonant inductor.

Referring to FIG. 12, according to an embodiment, the transmitting side resonant inductor $L_1$ may include a first inductor $L_{11}$, a second inductor $L_{12}$, and a first switch $S_1$. In some embodiments, the first inductor $L_{11}$ and the first switch $S_1$ may be connected in series, and the first inductor $L_{11}$ and the first switch $S_1$ may be connected in parallel to the second inductor $L_{12}$.

When the first switch $S_1$ is turned on (ON), the inductance of the transmitting side resonant inductor $L_1$ may be calculated as in equation 9.

$$L_1 = \frac{L_{11} L_{12}}{L_{11} + L_{12}} \qquad <\text{Equation 9}>$$

On the other hand, when the first switch $S_1$ is turned off (OFF), the inductance of the transmitting side resonant inductor $L_1$ may be $L_{12}$.

That is, the inductance of the transmitting side resonant inductor $L_1$ may be regulated, depending on whether the first switch $S_1$ is turned on/off. As such, the wireless power transmitter 100 may regulate the inductance of the transmitting side resonant inductor $L_1$ by turning on/off the first switch $S_1$ depending on the inductance of the receiving side resonant inductor $L_2$ (i.e., the type of the wireless power receiver 200).

Moreover, referring to FIG. 13, according to another embodiment, the transmitting side resonant inductor $L_1$ may include a first inductor $L_{11}$, a second inductor $L_{12}$, a first switch $S_1$, and a second switch $S_2$.

In some embodiments, the first inductor $L_{11}$ and the first switch $S_1$ may be connected in series, and the second inductor $L_{12}$ and the second switch $S_2$ may be connected in series. Further, the first inductor $L_{11}$ and the first switch $S_1$ may be connected in parallel to the second inductor $L_{12}$ and the second switch $S_2$.

When the first switch $S_1$ is turned on and the second switch $S_2$ is turned off, the inductance of the transmitting side resonant inductor $L_1$ may be $L_{11}$. On the other hand, when the first switch $S_1$ is turned off and the second switch $S_2$ is turned on, the inductance of the transmitting side resonant inductor $L_1$ may be $L_{12}$.

As illustrated in FIG. 12 and FIG. 13, the wireless power transmitter 100 may include two transmitting side resonant inductors $L_1$, so as to select the inductance of either of the two transmitting side resonant inductors $L_1$ depending on the CR to the receiving side resonant inductor and transmit power to the wireless power receiver 200.

FIG. 14 is a view showing characteristics of charging efficiency and heat generation temperature according to an embodiment.

Conventionally, it was not possible to measure charging efficiency and heat generation temperature if the CR between the transmitting side resonant inductor and the receiving side resonant inductor varies.

On the other hand, as illustrated in FIG. 14, the embodiment explained with reference to FIGS. 12 and 13 provides a configuration in which a plurality of transmitting side resonant inductors are included. Therefore, it is possible to measure charging efficiency and heat generation temperature even if the CR between the transmitting side resonant inductor and the receiving side resonant inductor varies, thereby improving the compatibility between the wireless power transmitter and the wireless power receiver.

While the above description has been made with reference to the embodiments and drawings, it will be understood by those skilled in the art to which this present disclosure belongs that various changes and modifications may be made without departing from the scope of embodiments as defined by the appended claims.

What is claimed is:

1. A wireless power receiver comprising:
a receiving pad configured to receive power transmitted from a wireless power transmitter including a transmitting pad and a transmitting side resonant inductor; and
a receiving side resonant network including a receiving side resonant inductor that controls power supplied to the receiving pad,
wherein a first inductance of the receiving side resonant inductor and a second inductance of the transmitting side resonant inductor are determined to be different from each other,
wherein, when the receiving pad has a permeability greater than 300 H/m and a ratio between the first inductance and the second inductance is less than 1, a heat generation temperature variation rate, measured during 30 minutes from a time the power is received from the wireless power transmitter, is less than or equal to 2.0° C./min.

2. The wireless power receiver of claim 1, wherein the first inductance of the receiving side resonant inductor is determined to be lower than the second inductance of the transmitting side resonant inductor.

3. The wireless power receiver of claim 2, wherein the ratio of the first inductance to the second inductance is determined to be less than 1.

4. The wireless power receiver of claim 1, wherein, when the receiving pad has a permeability greater than 300 H/m and the ratio between the first inductance and the second inductance is less than 1, a heat generation temperature variation rate measured during 10 minutes from the time the power is received from the wireless power transmitter is less than or equal to 3.1° C./min.

5. The wireless power receiver of claim 1, wherein, when the receiving pad has a permeability of 300 H/m or less and the ratio between the first inductance and the second inductance is less than 1, a heat generation temperature variation rate measured during 30 minutes from the time the power is received from the wireless power transmitter is less than or equal to 3.00° C./min.

6. A wireless power transmitter comprising:
a transmitting pad configured to transmit power to a wireless power receiver including a receiving pad and a receiving side resonant inductor; and
a transmitting side resonant network including a transmitting side resonant inductor that controls power supplied to the transmitting pad,
wherein a first inductance of the receiving side resonant inductor and a second inductance of the transmitting side resonant inductor are determined to be different from each other,
wherein, when the transmitting pad has a permeability greater than 300 H/m and a ratio between the first inductance and the second inductance is less than 1, a heat generation temperature variation rate, measured during 30 minutes from the time the power is transmitted to the wireless power receiver is less than or equal to 2.0° C./min.

7. The wireless power transmitter of claim 6, wherein the first inductance of the receiving side resonant inductor is determined to be lower than the second inductance of the transmitting side resonant inductor, and the ratio of the first inductance to the second inductance is determined to be less than 1.

8. The wireless power transmitter of claim 6,
when the transmitting pad has a permeability greater than 300 H/m and the ratio between the first inductance and the second inductance is less than 1, a heat generation temperature variation rate measured during 20 minutes from the time the power is transmitted to the wireless power receiver is less than or equal to 2.4° C./min, and
when the transmitting pad has a permeability greater than 300 H/m and the ratio between the first inductance and the second inductance is less than 1, a heat generation temperature variation rate measured during 10 minutes from the time the power is transmitted to the wireless power receiver is less than or equal to 3.1° C./min.

9. The wireless power transmitter of claim 6, wherein, when the transmitting pad has a permeability greater than 300 H/m and the ratio between the first inductance and the second inductance is less than 1, a heat generation temperature variation rate measured during 30 minutes from the time the power is transmitted to the wireless power receiver is less than or equal to 3.0° C./min,
  when the transmitting pad has a permeability of 300 H/m or less and the ratio between the first inductance and the second inductance is less than 1, a heat generation temperature variation rate measured during 20 minutes from the time the power is transmitted to the wireless power receiver is less than or equal to 3.8° C./min, and
  when the transmitting pad has a permeability of 300 H/m or less and the ratio between the first inductance and the second inductance is less than 1, a heat generation temperature variation rate measured during 10 minutes from the time the power is transmitted to the wireless power receiver is less than or equal to 5.50° C./min.

10. A means of transport comprising:
  a wireless power receiver including a receiving pad configured to receive power transmitted from a wireless power transmitter having a transmitting pad and a transmitting side resonant inductor, and a receiving side resonant network having a receiving side resonant inductor that controls power supplied to the receiving pad; and
  a battery that is charged with power received by using the wireless power receiver,
  wherein a first inductance of the receiving side resonant inductor and a second inductance of the transmitting side resonant inductor are determined to be different from each other,
  wherein, when the receiving pad has a permeability greater than 300 H/m and a ratio between the first inductance and the second inductance is less than 1, a heat generation temperature variation rate, measured during 30 minutes from a time the power is received from the wireless power transmitter, is less than or equal to 2.0° C./min.

* * * * *